United States Patent
Katz et al.

(10) Patent No.: US 11,625,630 B2
(45) Date of Patent: Apr. 11, 2023

(54) IDENTIFYING INTENT IN DIALOG DATA THROUGH VARIANT ASSESSMENT

(71) Applicant: International Business Machines Corporation, Armonk, NY (US)

(72) Inventors: Edward G. Katz, Washington, DC (US); John Riendeau, Madison, WI (US); Sean T. Thatcher, Stone Ridge, VA (US); Alexander C. Tonetti, Washington, DC (US)

(73) Assignee: International Business Machines Corporation, Armonk, NY (US)

( * ) Notice: Subject to any disclaimer, the term of this patent is extended or adjusted under 35 U.S.C. 154(b) by 1279 days.

(21) Appl. No.: 15/881,445

(22) Filed: Jan. 26, 2018

(65) Prior Publication Data
US 2019/0236471 A1 Aug. 1, 2019

(51) Int. Cl.
*G06N 5/04* (2006.01)
*G06N 20/00* (2019.01)
(Continued)

(52) U.S. Cl.
CPC .............. *G06N 5/048* (2013.01); *G06F 16/35* (2019.01); *G06F 40/216* (2020.01); *G06F 40/232* (2020.01); *G06F 40/284* (2020.01); *G06F 40/35* (2020.01); *G06F 40/56* (2020.01); *G06N 20/00* (2019.01)

(58) Field of Classification Search
CPC ........ G06N 5/048; G06N 20/00; G06N 5/046; G06N 5/00; G06F 40/35; G06F 40/56; G06F 40/216; G06F 40/232; G06F 40/284; G06F 16/35; G06F 16/65; G06F 11/00; G06F 40/44
See application file for complete search history.

(56) References Cited

U.S. PATENT DOCUMENTS 6,601,059 B1   7/2003   Fries
6,647,383 B1   11/2003  August et al.
(Continued)

FOREIGN PATENT DOCUMENTS

EP      2391105 A1 * 11/2011 ............. G10L 17/26
WO  WO-2017094913 A1 * 6/2017 ........... G06F 17/271

OTHER PUBLICATIONS

Hirst, G. et al., Correcting Real-World Spelling Errors By Restoring Lexical Cohesion, University of Toronto, Natural Language Engineering 11 (1): 87-111, Dec. 2003. (Year: 2003).*
(Continued)

*Primary Examiner* — James D. Rutten
(74) *Attorney, Agent, or Firm* — Lieberman & Brandsdorfer, LLC (57) ABSTRACT

A system, computer program product, and method are provided for use with an intelligent computer platform to identify intent and convert the intent to one or more physical actions. The aspect of converting intent includes receiving content, identifying potential variants, and statistically analyzing the variants with a confidence assessment. The variants are sorted based on a protocol associated with the confidence assessment. A variant from the sort is selected and applied to a physical device, which performs a physical action and an associated hardware transformation based on the variant.

20 Claims, 4 Drawing Sheets

(51) Int. Cl.
  *G06F 16/35* (2019.01)
  *G06F 40/35* (2020.01)
  *G06F 40/56* (2020.01)
  *G06F 40/216* (2020.01)
  *G06F 40/232* (2020.01)
  *G06F 40/284* (2020.01)
  *G06N 5/048* (2023.01)

(56) References Cited

U.S. PATENT DOCUMENTS

| | | | |
|---|---|---|---|
| 6,782,510 | B1 | 8/2004 | Gross et al. |
| 7,296,019 | B1 | 11/2007 | Chandrasekar et al. |
| 8,645,124 | B2 | 2/2014 | Zangvil |
| 8,942,986 | B2 | 1/2015 | Cheyer et al. |
| 9,002,866 | B1 | 4/2015 | Brunsman et al. |
| 9,582,153 | B1* | 2/2017 | Childress ............ G06F 16/3344 |
| 2003/0217052 | A1* | 11/2003 | Rubenczyk ......... G06F 16/3323 |
| 2007/0016616 | A1 | 1/2007 | Brill et al. |
| 2010/0138215 | A1* | 6/2010 | Williams ................ G10L 15/22 704/9 |
| 2011/0294525 | A1* | 12/2011 | Jonsson ............ H04M 1/72439 345/589 |
| 2012/0158685 | A1 | 6/2012 | White et al. |
| 2014/0214405 | A1* | 7/2014 | Ouyang ................ G06F 3/0237 704/9 |
| 2016/0196499 | A1* | 7/2016 | Khan ..................... G06N 5/048 706/52 |
| 2018/0068658 | A1* | 3/2018 | Lehman ................. G06F 40/35 |

OTHER PUBLICATIONS

J. D. OShea, Z. A. Bandar and K. A. Crockett, "Optimizing Features for Dialogue Act Classification," 2013 IEEE International Conference on Systems, Man, and Cybernetics, 2013, pp. 474-479, doi: 10.1109/SMC.2013.87. (Year: 2013).*

Khurana et al. "Natural language processing: state of the art, current trends and challenge", 2022, Springer Science and Business Media, Multimedia Tools and Application (Year: 2022).*

Jayakodi, K. et al., An Automatic Classifier for Exam Questions In Engineering: A Process for Bloom's Taxonomy, 2015 IEEE International Conference on Teaching, Assessment, and Learning for Engineering (TALE), Dec. 10-12, 2015, pp. 195-202.

Chawla, R., Filtering Social Tags for Songs Based on Lyrics Using Clustering Methods, University of Miami, Jul. 21, 2011.

Oye, John A., Sentiment Analysis of Norwegian Twitter Messages, NTNU—Trondheim, Norwegian University of Science and Technology, Jan. 2015.

Chalothorn, T., Quantitative Assessment of Factors in Sentiment Analysis, University of Northumbria at New Castle, Jun. 2016.

Hirst, G. et al., Correcting Real-World Spelling Errors By Restoring Lexical Cohesion, University of Toronto, Natural Language Engineering 11 (1): 87-111, Dec. 2003.

* cited by examiner

IDENTIFYING INTENT IN DIALOG DATA THROUGH VARIANT ASSESSMENT

BACKGROUND

The present embodiment(s) relate to natural language processing. More specifically, the embodiment(s) relate to an artificial intelligence platform for identifying and classifying dialog and constructing an output string corresponding to the dialog data.

In the field of artificially intelligent computer systems, natural language systems (such as the IBM Watson® artificially intelligent computer system and other natural language question answering systems) process natural language based on knowledge acquired by the system. To process natural language, the system may be trained with data derived from a database or corpus of knowledge, but the resulting outcome can be incorrect or inaccurate for a variety of reasons relating to the peculiarities of language constructs and human reasoning.

Machine learning, which is a subset of Artificial intelligence (AI), utilizes algorithms to learn from data and create foresights based on this data. AI refers to the intelligence when machines, based on information, are able to make decisions, which maximizes the chance of success in a given topic. More specifically, AI is able to learn from a data set to solve problems and/or provide relevant recommendations. AI is a subset of cognitive computing, which refers to systems that learn at scale, reason with purpose, and naturally interact with humans. Cognitive computing is a mixture of computer science and cognitive science. Cognitive computing utilizes self-teaching algorithms that use data minimum, visual recognition, and natural language processing to solve problems and optimize human processes.

Cognitive systems are inherently non-deterministic. Specifically, data output from cognitive systems are susceptible to information provided and used as input. For example, as new machine learning models are deployed there is no guarantee that the system will extract the same entities as done previously. New models may adversely affect prior model results. Similarly, an error introduced through a document may result in extracting incorrect data and providing the incorrect data as output. Accordingly, there is a need to create deterministic behavior in the cognitive system(s).

SUMMARY

The embodiments include a system, computer program product, and method for classifying dialog data based on assessed intent.

In one aspect, a system is provided for use with an intelligent computer platform. A processing unit is operatively coupled to memory and is in communication with an artificial intelligence platform. A knowledge engine tool, in communication with the processing unit, is activated by the artificial intelligence platform to utilize machine learning to assess dialog input data received by the artificial intelligence platform. A classifier is provided operatively coupled to the knowledge engine, and functions to assign the input data to a text classification. In addition, a dialog manager is provided operatively coupled to the knowledge engine, the dialog manager functions to identify one or more tokens present in the data subject to evaluation, and to create at least one alternative dialog input data in the form of the assessed input modified with a replacement of the identified one or more tokens with alternative input dialog. The classifier assigns each variant of the dialog input data to a text classification, and statistically assesses validity of the classification assignment of each variant. The knowledge engine utilizes the statistical assessment to identify and select a final dialog data. A constructed output string corresponding to the final dialog data is returned from the knowledge engine and applied to a physical hardware device.

In another aspect, a computer program device is provided to assess dialog input received by an artificial intelligence platform and to convert the assessed input into a physical action. The computer program product utilizes a computer readable storage device with embodied executable program code executable by a processing unit. Program code utilizes machine learning to assess dialog input data received by the artificial intelligence platform and to assign the input data to a text classification. For each classification, the program code identifies one or more tokens present in the data subject to evaluation and creates at least one alternative dialog input data. The alternative data includes the assessed input modified with a replacement of the identified one or more tokens with alternative input dialog. Program code assigns each variant of the dialog input data to a text classification, and statistically assesses validity of the classification assignment of each variant. The program code further utilizes the statistical assessment to identify and select a final dialog data, and to apply a constructed output string with the final dialog data returned from the knowledge engine and to a physical hardware device.

In yet another aspect, a method is provided for assessing input content, converting the content to an identified variant, and applying the variant to a physical hardware device. The method assesses dialog input data received by the artificial intelligence platform, and assigns the input data to a text classification. For each classification, one or more tokens present in the data subject to evaluation are identified, and at least one alternative dialog input data is created. The alternative data includes the assessed input modified with a replacement of the identified one or more tokens with alternative input dialog. Each of the variants of the dialog input data received from the dialog manager is assigned to a text classification, and the validity of the classification assignments is statistically assessed. A final dialog data is identified and selected based on the statistical assessment, and a constructed output string is returned. The output string is applied to a physical hardware device, thereby transforming the device from a first operating state to a second operating state.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments, unless otherwise explicitly indicated.

DETAILED DESCRIPTION

It will be readily understood that the components of the present embodiments, as generally described and illustrated in the Figures herein, may be arranged and designed in a wide variety of different configurations. Thus, the following details description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

In the field of AI, algorithms are utilized to learn from data and create foresights based on this data. More specifically, data is received or otherwise utilized as input into one or more AI algorithms to create an output. However, it is understood that input data received by the AI system or an associated AI algorithm may contain an error. Such errors may then produce future errors, such as a syntax error in the AI algorithm, or selection or identification of an inappropriate algorithm or instruction. Ensuring accuracy of the input data, or in one embodiment correcting any identifiable error in the input data, may be critical to the AI system or the underlying AI algorithms.

Figure 1:
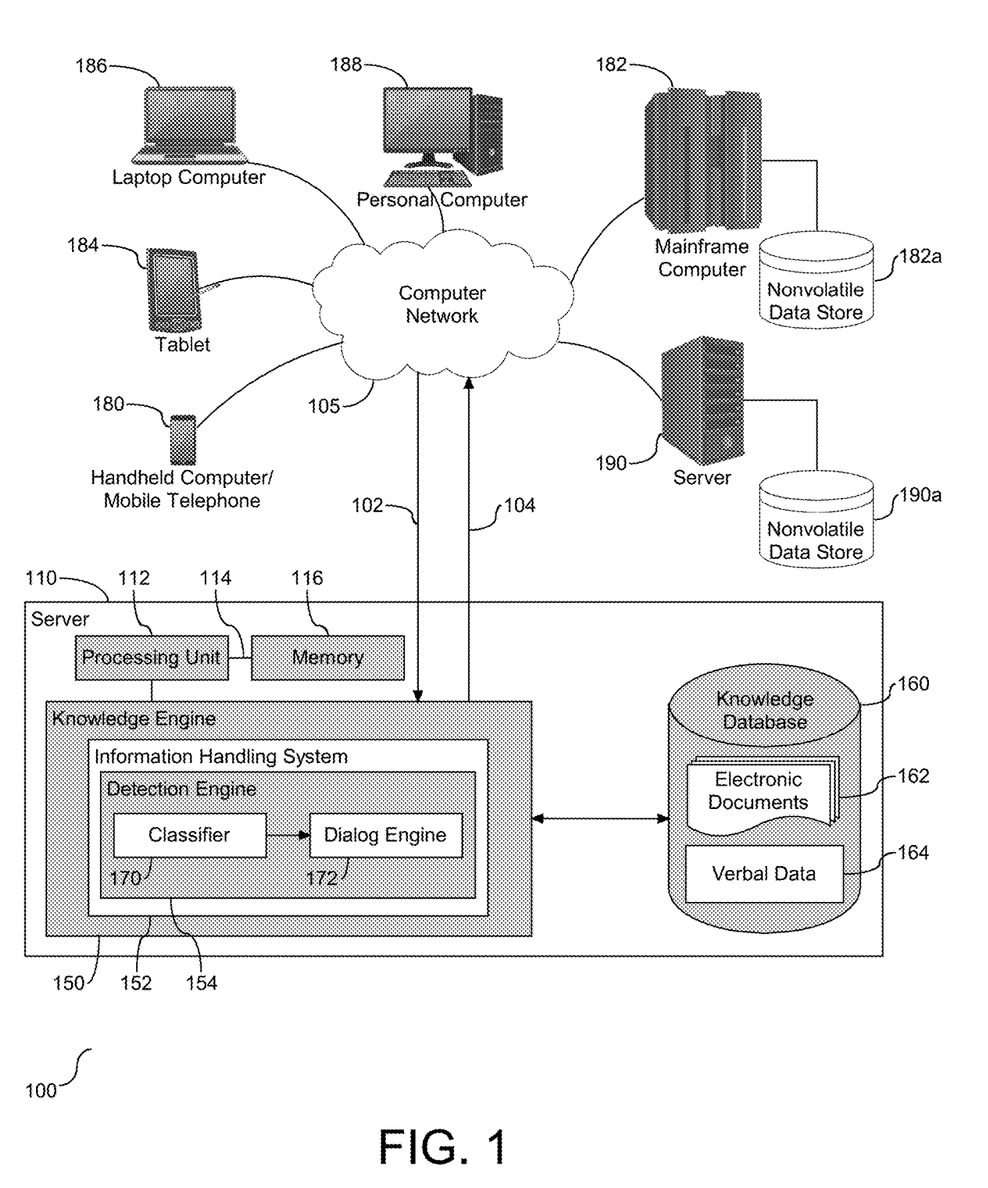
FIG. 1 depicts a system diagram illustrating a schematic diagram of a natural language process system.

It is understood that in the field of AI instructions may be presented or receive through an input string via text or text based input, or orally with a voice to text conversion algorithm or tool. Referring to FIG. 1, a schematic diagram of a natural language process system (100) is depicted to assess the input string. As shown, a server (110) is provided in communication with a plurality of computing devices (180), (182), (184), (186), and (188) across a network connection (105). The server (110) is configured with a processing unit (112) operatively coupled to memory (116) across a bus (114). A knowledge engine (150) is shown operating coupled to the processing unit (112), with the knowledge engine provided for natural language processing over the network (105) from one or more computing devices (180), (182), (184), (186) and (188). More specifically, the computing devices (180), (182), (184), (186), and (188) communicate with each other and with other devices or components via one or more wired and/or wireless data communication links, where each communication link may comprise one or more wires, routers, switches, transmitters, receivers, or the like. In this networked arrangement, the server (110) and the network connection (105) may enable dialog recognition and resolution for one or more content users. Other embodiments of the server (110) may be used with components, systems, sub-systems, and/or devices other than those that are depicted herein.

The knowledge engine (150) is configured to receive input from various sources. For example, the knowledge engine (150) may receive input in the form of communication related textual data with electronic document data (162), verbal data (164), or other data, content users, and other possible sources of input from the network (105) or one or more knowledge bases or corpus (160). The various computing devices (180), (182), (184), (186), and (188) in communication with the network (105) demonstrate access points for receipt of dialog content. Some of the computing devices may include devices for a database storing a corpus of data as a body of information used by the knowledge engine (150) to assess received string data and construct an output string based on an associated classification of received content. The network (105) may include local network connections and remote connections in various embodiments, such that the knowledge engine (150) may operate in environments of any size, including local and global, e.g. the Internet. Additionally, the knowledge engine (150) serves as a front-end system that can make available a variety of knowledge extracted from captured content. In this manner, some processes utilize the knowledge engine (150) to populate the corpus (160) with the knowledge engine (150) also including input interfaces to receive requests and respond accordingly.

Content is referred to herein in the form of string data, and in one embodiment textual data. The content may be received in the form of written content, such as different forms of textual data, and verbal content that has been captured and converted to textual data. In one embodiment, a tool may be employed to capture audio data and to convert the received audio data to textual data. Such tools are known in the art. The knowledge base (160) stores one or more captured verbal phrases (164). It is understood that the knowledge base (160) may contain a large quantity of phrases (162), and as such, utilizes or implements a system for organizing the phrases. For example, in one embodiment, the knowledge base (160) may utilize a classification system to arrange items into classes or categories thereby dividing information into manageable and logical portions. The classes or categories represent a shared property that provides an associated identity. Each class or category may be further divided into smaller classes or subclasses, etc., thereby provided a hierarchy to the organization of the classes and sub-classes. In one embodiment, classes may be arranged by topics.

The verbal data (164) may include any structured and unstructured text representation of verbal content for use by the knowledge engine (150). Content users may access the knowledge engine (150) via a network connection or a remote connection to the network (105), and may submit natural language input to the knowledge engine (150) that may effectively determine intent associated with the input string by searching content in the corpus of data (160). As further described below, when a process evaluates captured input string(s) or speech converted to an input string, the process can use a variety of conventions to query a correlation from the knowledge engine (150). The verbal data (164) is also referred to as a semantic content, which is content that interprets an expression, such as by using Natural Language (NL) processing. In one embodiment, the process sends verbal content (102), e.g. natural language text, to the knowledge engine (150), so that the content (102)

may be converted to a text representation, if necessary, and the knowledge engine (150) may identify one or more keywords in the text representation, identify an association between two or more identified keyword(s), and provide output in the form of an appropriate response. In one embodiment, the input text or string may be in the form of one or more affirmative instructions to execute an algorithm, and the output clarifies or corrects the input string so that the appropriate instruction or algorithm is processed.

In some illustrative embodiments, server (110) may be the IBM Watson® system available from International Business Machines Corporation of Armonk, N.Y., which is augmented with the mechanisms of the illustrative embodiments described hereafter. The IBM Watson® knowledge manager system may receive input content (102) which it then converts to a text representation to identify one or more keywords in the text representation (102) that in turn are then applied to the corpus of data stored in the knowledge base (160). Based on application of the input content (102) to the corpus of data, a set of candidate outcomes are generated by looking across the corpus of data for portions of the corpus of data that have potential for containing a matching or correlating keyword appropriately related to the context of the input content (102).

In particular, received content (102) may be processed by the IBM Watson® server (110) which performs analysis on the language of the input content (102) and the keyword(s) used in each of the portions of the corpus of data found during application of the content using a variety of reasoning algorithms. There may be multiple reasoning algorithms applied, each of which performs different analysis, e.g., comparisons, and generates a score. For example, one or more reasoning algorithms may look at the matching of terms and synonyms within the language of the input content (102) and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response (104) is inferred by the input content (102) based on the specific area of focus of that reasoning algorithm. Each resulting score is weighted against a statistical model. The statistical model may be used to summarize a level of confidence that the IBM Watson® system has regarding the evidence that the potential response (104), i.e., candidate affirmative instruction to replace the received content (102), is inferred by the input content (102). This process may be repeated for each of the candidate outcomes (104) until the IBM Watson® system (110) identifies candidate outcomes that are significantly stronger than others and thus, generates a final replacement string for the input content (102), or in one embodiment, a ranked set of replacement strings for the input content (102).

To process natural language, the system (110) may include an information handling system (152) which uses a detection engine (154) to identify one or more keywords in the text representation of the input content (102). Though shown as being embodied in or integrated with the server (110), the information handling system (152) and/or detection engine (154) may be implemented in a separate computing system (e.g., 190) that is connected across the network (105) to the server (110). Wherever embodied, the detection engine (154) detects and identifies keywords in a text representation of input content.

In selected example embodiments, the detection engine (154) may include a classifier (170) that is configured to apply NL processing to detect a correlation between text represented in the input content (102) and one or more classes and/or subclasses in the associated classification system utilized by the knowledge base (160). As shown, a dialog engine (172) is operatively coupled to the classifier (170). The dialog engine (172) functions to identify any keywords present in the input content (102), and to convert each identified keyword into a token. Once the token(s) is identified, the dialog engine (172) creates one or more alternative string data as possible replacements for the input content. In one embodiment, each token replacement or combination of token replacements with the original string data creates different formatives of the alternative string data. Accordingly, the dialog engine (172) functions to identify one or more tokens and to create one or more forms of alternative string data as a potential replacement to the input content (102).

Each form of the alternative string data is assessed in relation to the intent associated with the input content (102). In one embodiment, the goal of the keyword identification and replacement is to maintain the form and function of the input content (102). Similarly, in one embodiment, each alternative string data is referred to herein as a variant of the input content (102). The classifier (170) evaluates each form of the alternative string data. More specifically, the classifier (170) assigns each variant to a class or subclass within the classification, and statistically evaluates the validity of the variant with respect to the class/subclass assignment. In one embodiment, the statistical evaluation is considered in view of the original intent, algorithm, etc. Similarly, in one embodiment, two or more variants are sorted. For example, a parameter may be employed to identify an appropriate variant from a list of two or more variants, to further identify the appropriate syntax for the input content. Following the sort or identification of appropriate input content, the classifier (170) identifies an output string and either converts the input content to the syntax of the identified output string or selects the output string from the list. The output string is forwarded to the knowledge engine (150) as a constructed output string. In one embodiment, the knowledge engine (150) forwards the output string to one of the computing devices (180), (182), (184), (186), and (188) in communication with the network (105).

The classifier (170) functions to conduct the assessment of the input content (102). Different forms of assessment may be employed. In one embodiment, the form of assessment may be selected. Similarly, in one embodiment, the form of assessment is dynamically selected by the knowledge engine (150) based on the content and/or context of the input content (102). For example, the classifier (170) may conduct the assessment based on the quantity of differences and an associated replacement score. In one embodiment, the differences may be a quantity of words that are changed between the input content and the variant. A numerical value is assigned to the assessed quantity for each variant. The numerical value may be considered a replacement score, also understood as a word edit distance in which a possible word could be replaced based on the semantic type, grammatical fit, etc. In one embodiment, the replacement score is a term directed at how 'close' natural language inputs are from the perspective of the language. Another form of statistical assessment employs the classifier (170) to assign a confidence value to each variant and to aggregate the assigned confidence values to two or more of the variants. The assigned confidence value reflects an accuracy of a correct classification to each variant. Similarly, the classifier (170) may be employed to feed each variant into at least two different classes or subclasses, and to perform separate statistical assessment for each variant in each of the at least two different classes or subclasses. In one embodiment, the classifier further aggregates the statistical assessments in each of the two different classes or subclasses. In another embodiment, the knowledge engine (150) functions with the classifier (170) to perform a sorting or ranking of the classifications based on the statistical assessment. Accordingly, the classifier (170) functions as the statistical arm of the system to assess the viability of the variants in view of the content and context of the input content (102).

Types of information handling systems that can utilize system (110) range from small handheld devices, such as a handheld computer/mobile telephone (180) to large mainframe systems, such as a mainframe computer (182). Examples of a handheld computer (180) include personal digital assistants (PDAs), personal entertainment devices, such as MP4 players, portable televisions, and compact disc players. Other examples of information handling systems include pen or tablet computer (184), laptop or notebook, computer (186), personal computer system (188) or server (190). As shown, the various information handling systems can be networked together using computer network (105). Types of computer network (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (190) utilizes nonvolatile data store (190a), and mainframe computer (182) utilizes nonvolatile data store (182a). The nonvolatile data store (182a) can be a component that is external to the various information handling systems or can be internal to one of the information handling systems. An illustrative example of an information handling system showing an exemplary processor and various components commonly accessed by the processor is shown and described in FIG. 2.

Figure 2:
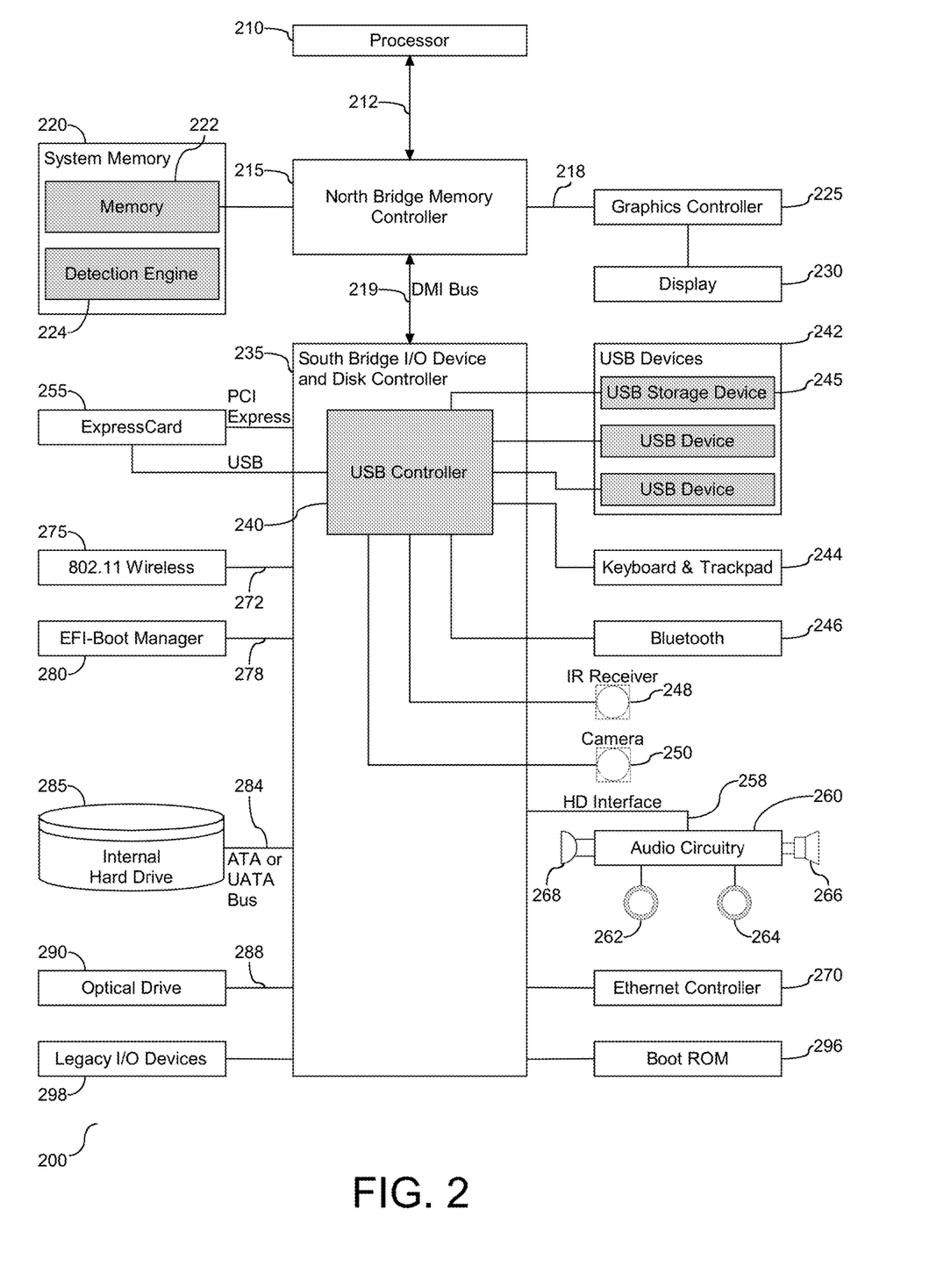
FIG. 2 depicts a block diagram of a processor and components of an information handling system such as those shown in FIG. 1.

Referring to FIG. 2, a block diagram (200) is provided illustrating information handling system. As shown, one or more processors (210) are coupled to processor interface bus (212), which connects processors (210) to Northbridge (215), which is also known as the Memory Controller Hub (MCH). Northbridge (215) connects to system memory (220) and provides a means for processor(s) (210) to access the system memory (220). In the system memory (220), a variety of programs may be stored in one or more memory devices (222), including a detection engine (224) which may be invoked to employed detect and process input content by parsing or breaking a text representation of verbal content into one or more keywords and then use identified keyword(s) as input to the corpus to determine one or more variants. Graphics controller (225) also connects to Northbridge (215). In one embodiment, PCI Express bus (218) connects Northbridge (215) to graphics controller (225). Graphics controller (225) connects to display device (230), such as a computer monitor.

Northbridge (215) and Southbridge (235) connect to each other using DMI bus (219). In one embodiment, the bus is a Direct Media Interface (DMI) bus that transfers data at high speeds in each direction between Northbridge (215) and Southbridge (235). In another embodiment, a Peripheral Component Interconnect (PCI) bus connects the Northbridge and the Southbridge. Southbridge (235), also known as the I/O Controller Hub (ICH), is a chip that generally implements capabilities that operate at slower speeds than the capabilities provided by the Northbridge (215). Southbridge (235) typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM (296) and "legacy" I/O devices (298) (using a "super I/O" chip). The "legacy" I/O devices (298) can include, for example, serial and parallel ports, keyboard, mouse, and/or a floppy disk controller. Other components often included in Southbridge (235) include a Direct Memory Access (DMA) controller, a Programmable Interrupt Controller (PIC), and a storage device controller, which connects Southbridge (235) to nonvolatile storage device (285), such as a hard disk drive, using ATA or UATA bus (284).

ExpressCard (255) is a slot that connects hot-pluggable devices to the information handling system. ExpressCard (255) supports both PCI Express and USB connectivity as it connects to Southbridge (235) using both the Universal Serial Bus (USB) the PCI Express bus. Southbridge (235) includes USB Controller (240) that provides USB connectivity to devices that connect to the USB. These devices include webcam (camera) (250), infrared (IR) receiver (248), keyboard and trackpad (244), and Bluetooth device (246), which provides for wireless personal area networks (PANs). USB Controller (240) also provides USB connectivity to other miscellaneous USB connected devices (242), such as a mouse, removable nonvolatile storage device (245), modems, network cards, ISDN connectors, fax, printers, USB hubs, and many other types of USB connected devices. While removable nonvolatile storage device (245) is shown as a USB-connected device, removable nonvolatile storage device (245) could be connected using a different interface, such as a Firewire interface, etc.

Wireless Local Area Network (LAN) device (275) connects to Southbridge (235) via the PCI or PCI Express bus (272). LAN device (275) typically implements one of the IEEE 802.11 standards for over-the-air modulation techniques to wireless communicate between information handling system (200) and another computer system or device. Extensible Firmware Interface (EFI) manager (280) connects to Southbridge (235) via Serial Peripheral Interface (SPI) bus (278) and is used to interface between an operating system and platform firmware. Optical storage device (290) connects to Southbridge (235) using Serial ATA (SATA) bus (288). Serial ATA adapters and devices communicate over a high-speed serial link. The Serial ATA bus also connects Southbridge (235) to other forms of storage devices, such as hard disk drives. Audio circuitry (260), such as a sound card, connects to Southbridge (235) via HD interface (258). Audio circuitry (260) also provides functionality such as audio line-in and optical digital audio in port (262), optical digital output and headphone jack (264), internal speakers (266), and internal microphone (268). Ethernet controller (270) connects to Southbridge (235) using a bus, such as the PCI or PCI Express bus. Ethernet controller (270) connects information handling system (200) to a computer network, such as a Local Area Network (LAN), the Internet, and other public and private computer networks.

While FIG. 2 shows one information handling system (200), an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory. In addition, an information handling system need not necessarily embody the north bridge/south bridge controller architecture, as it will be appreciated that other architectures may also be employed.

Figure 3:
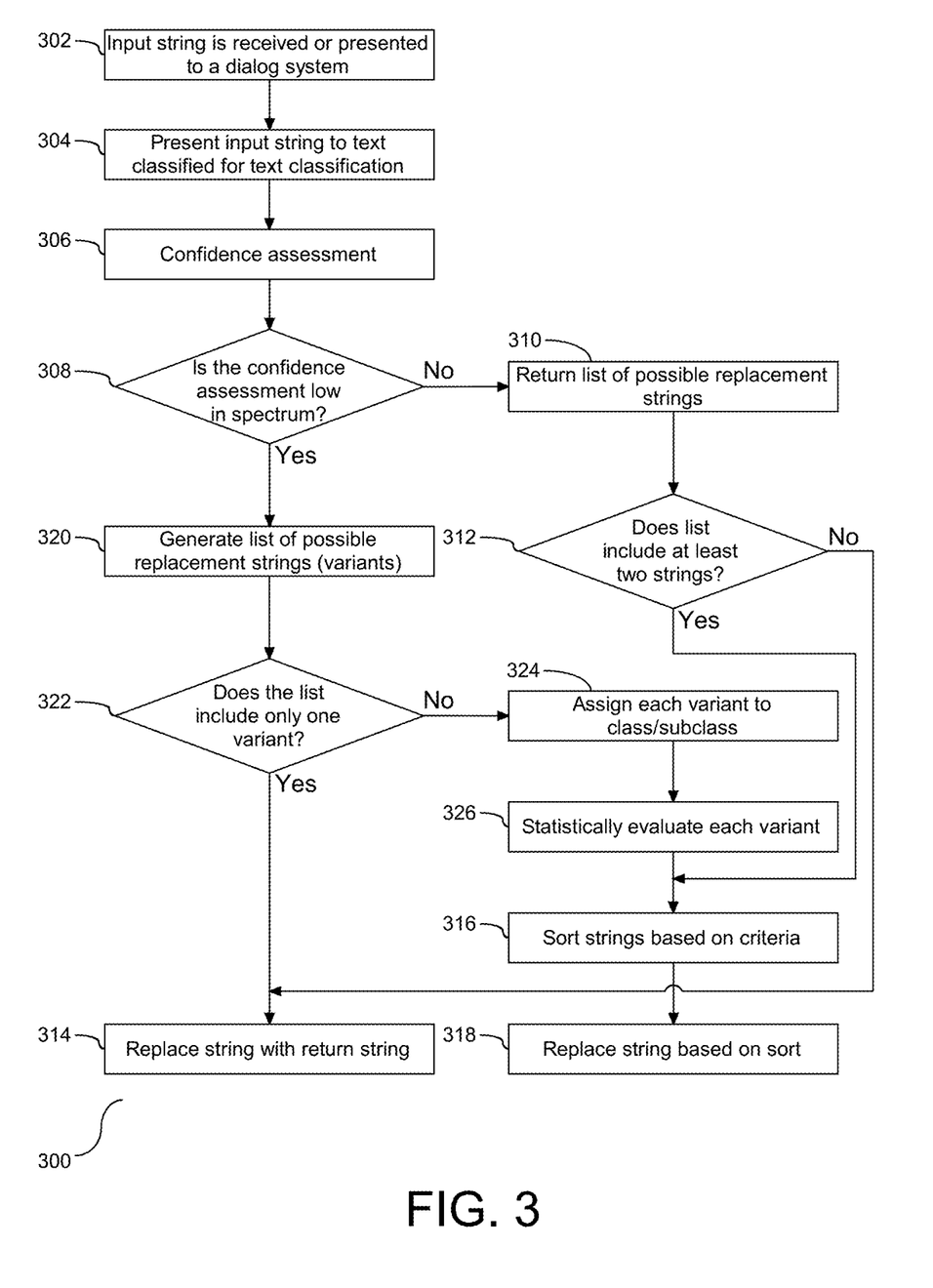
FIG. 3 depicts a flow chart illustrating a process for processing dialog data in conjunction with a dialog classification system.

To provide additional details for an improved understanding of selected embodiments of the present disclosure, reference is now made to FIG. 3 which illustrates a process for automated dialog processing. Referring to FIG. 3, a flow chart (300) is provided illustrating a process for processing dialog data in conjunction with a dialog classification system. Speech to text services are known and recognized in the art and one or more of these services or applications are utilized to process verbal content. Similarly, in one embodiment these or similar services are utilized to identify one or more keywords in received text. As shown, an input string is received or otherwise presented to a conversational dialog system (302). The received input string is presented to a text based classifier to classify the input string (304). In one embodiment, the classifier utilizes a classification system with multiple classes and/or subclasses, also referred to herein as buckets. The classification may be one dimensional or in one embodiment multi-dimensional forming a hierarchy with the classes and associated subclasses. The classification at step (304) is referred to herein as an initial classification, in which the classifier initially, or in one embodiment temporarily, places the input string into an identified bucket. For example, in one embodiment, the classifier may employ a keyword identification to place the input string in a bucket associated with the keyword. Accordingly, the initial aspect of processing dialog data utilizes a classification system, identifies an initial class and/or subclass within the classification system, and assigns the received dialog to an initial class and/or subclass.

Once the data has been initially classified, the data is subject to a confidence assessment (306) with respect to the initial classification. The assessment is shown herein to be directed at the classifier and an evaluation as to the correct assignment of the input string to the associated bucket, e.g. class and/or subclass. In one embodiment, the confidence assessment is a numerical value assigned by the classifier to the dialog and quantifies the appropriateness of the input string to the associated bucket. It is then determined if the confidence assessment is considered low in view of an associated confidence spectrum (308). In one embodiment, the confidence assessment may be inverted to assess if the confidence assessment is considered high in view of the associated confidence spectrum, and as such, the determination at step (308) should not be considered limiting. A negative response to the determination at step (308) is followed by the classifier returning a list of possible replacement strings for the input string (310). Although the processed input string has been initially classified and the initial confidence assessment is strong, it has not been determined that the input text is free of errors. In one embodiment, the returned list at step (310) includes two or more text strings, each with an associated confidence score with respect to matching intent of the input string. Following step (310) it is determined if the returned list includes more than one potential replacement string (312). A negative response to the determination at step (312) is followed by replacing the input string with the string represented in the returned list (314), and a positive response to the determination at step (312) is followed by sorting of the potential strings identified in the returned list based on a criteria (316). In one embodiment, the criteria may be a confidence or closeness score of the input string to each potential string, although the criteria should not be considered limiting. Following step (316), the input content, e.g. input string, is replaced with the identified output content, e.g. output string, produced from the sorted list (318). The string replacements at steps (316) and (318) may include a presentation of the replacement string prior to the act of replacement. Accordingly, the classifier functions to statistically assess and selectively replace the input content.

As shown, an initial determination in the assessment is conducted at step (308) with respect to a confidence assessment. A positive response to the assessment at step (308) is followed by generating a list of possible replacement strings for the evaluated input content (320). As described in FIG. 1, each possible replacement string is also referred to herein as a variant. In one embodiment, variants reflect different formatives of the input content, such as one or more spelling corrections, word substitution, etc. It is understood that the list generated at step (320) may have a minimum of one variant, or in one embodiment may include a plurality of variants. Following step (320), it is determined if the list is limited to a single variant (322). A positive response to the determination at step (322) is followed by a return to step (314). However, a negative response to the determination at step (322) is followed by employing the classifier (170) to assign each variant to an appropriate class and/or subclass in the classification system (324). The classifier then conducts statistical evaluation of the variants in the list (326) followed by a return to step (316). The statistical evaluation at step (326) includes, but is not limited to, sorting the list of variants, selecting a subset of the variants based on a sorting characteristic and sorting order, and aggregating the select subject on one or more factors. For example, in one embodiment, the aggregation may be based on one or more of the following factors: frequency, class position, average confidence value, and edit distance. Accordingly, the classifier functions as the tool for statistically assessing the identified variants in view of the context of the input string.

It is understood that the input string may be comprised of a plurality of words. The replacement string may identify an alternative word usage, reflected in the original input string with a replacement of one or more words therein. In one embodiment, the alternative word usage may effectively replace a phrase within the string. Similarly, in one embodiment, the classifier may identify a potential spelling error and replace each misspelled word in the string with a replacement word. Accordingly, the replacement string may be an alternative version of the original string.

The following is an example of replacement of the input string with an identified variant. The input string is: I want a boling extension. The input string is sent to the classifier (170), which produces the following results:

TABLE 1

| Original Input String | Variants | Replacement Score |
| --- | --- | --- |
| I want a boling extension | I want a baling extension | 1 |
|  | I want a boiling extension | 1 |

TABLE 1-continued

| Original Input String | Variants | Replacement Score |
|---|---|---|
| | I want a billing extension | 2 |
| | I want a bailing extension | 2 |

As shown, the classifier has created four variants. Each of the variants replaces a single word in the phrase, 'boling' thereby creating a potential correction phrase. In this example, there are four variants, each representing a different potential correction phrase. In one embodiment, each replaced word is referred to as a token, and in this example the token is based on a spelling check of the input string. In another embodiment, the token identification and selection may be based on selecting one or more tokens absent from a dictionary or absent from a language model, etc. As shown each variant has an associated replacement score. In this example, the replacement score identifies the quantity of letters that are different when the replacement word is compared to the original word 'boling.' In another embodiment, the replacement score may identify the number of words that are different between the original phrase and each variant phrase. The example shown herein shows the variants in a sorted order, although in one embodiment, the sorting or sorted order may be inverted.

Based on the example shown in Table 1, the classifier (170) proceeds with further statistical assessment(s). As shown in the following table, Table 2, the classifier (170) conducts a preliminary assignment of the text variations to one or more classes or subclasses together with a statistical assessment of the classification assignment for each variant. The first 'variant' in the table is actually the original input string, and as such, the score imported from Table 1, also referred to herein as the replacement score has a value of zero.

TABLE 2

| Input | Score | Class 1 | Confidence 1 | Class 2 | Confidence 2 |
|---|---|---|---|---|---|
| I want a boling extension | 0 | Extension Requirements | 0.54 | Personal Extension Request | 0.06 |
| I want a baling extension | 1 | Personal Extension Request | 0.43 | Extension Time | 0.23 |

TABLE 2-continued

| Input | Score | Class 1 | Confidence 1 | Class 2 | Confidence 2 |
|---|---|---|---|---|---|
| I want a boiling extension | 1 | Adjustment Extension | 0.63 | Personal Extension Request | 0.12 |
| I want a billing extension | 2 | Personal Extension Request | 0.81 | Extension Requirements | 0.06 |

The confidence score associated with each of the proposed classes for each variant is a probability value assessed by the classifier (170). The probability is a numerical value that statistically reflects the closeness of the variant to the associated class or subclass.

As shown and described in Table 2, the classifier conducts an initial statistical assessment of each variant in multiple classes and/or subclasses. For each class and/or subclass there is an associated score. These scores are aggregated into a single score for each class and sorted based on the aggregated values, as shown and described in the following table, Table 3.

TABLE 3

| Class | Weighted Average | Final Rank |
|---|---|---|
| Personal Extension Request | 0.59 | 1 |
| Extension Requirements | 0.53 | 2 |
| Adjustment Extension | 0.63 | 3 |
| Extension Time | 0.23 | 4 |
| Extension Request | 0.02 | 5 |

The classes in Table 3 are shown sorted from the highest weighted average to the lowest weighted average. In one embodiment, the sorting may be inverted, and as such, the sorting shown herein should not be considered limiting. The class with the highest rank is identified for selection of a variant. In this example, the class is shown as "personal extension request." Thereafter, the dialog manager (172) chooses an appropriate response, e.g. variant, based on the top class and the confidence level. See FIG. 3 at step (316). As shown in Table 2, the variant in the identified "personal extension request" class with the highest confidence score is "I want a billing extension." Accordingly, in this example, the dialog manager (172) presents this variant as the replacement string.

Another example of assessment of an input string and replacement with an identified variant is provided. In this example, the input string is related to a travel planning dialog system. The input string is identified as "I want to rent a cat." As shown in the following table, Table 4, the classifier (170) conducts a preliminary assignment of the text variations to one or more classes or subclasses together with a statistical assessment of the classification assignment for each variant. The first 'variant' in the table is actually the original input string, and as such, the score, also referred to herein as the replacement score has a value of zero.

TABLE 4

| Input | Score | Class 1 | Confidence 1 | Class 2 | Confidence 2 |
|---|---|---|---|---|---|
| I want to rent a cat | 0 | CarRentalIntent | 0.22 | BikeRentalIntent | 0.06 |
| I want to rent a car | 1 | CarRentalIntent | 1.00 | BikeRentalIntent | 0 |
| I want to rent a cab | 1 | BikeRentalIntent | 0.13 | CarRentalIntent | 0.03 |
| I want to rent a cap | 1 | TruckRentalIntent | 0.16 | BikeRentalIntent | 0.12 |
| I want to rent a cot | 1 | CarRentalIntent | 0.21 | TruckRentalIntent | 0.06 |
| I want to rent a cop | 2 | BikeRentalIntent | 0.15 | CarRentalIntent | 0.03 |

Based on the example shown in Table 4, the Car Rental class is identified with 100% confidence as the input class. Specifically, the final output is determined by both the classifier and the distance metric, with the distance metric identifying how close the variant is to the input, and the classifier determining which variant is used to compute the final output. Any sorting of the variants would generate and return the associated string of "I want to rent a car" as the replacement string.

As shown and described in FIGS. 1-3, and the Examples represented in Tables 1-4, a confidence assessment is applied to an input string. It is understood that the string may be text based, or in one embodiment, text converted from speech. The input string and one or more variants are initially classified and the confidence assessment is conducted for each variant in each initial classification. One or more statistical algorithms are applied to the initial confidence assessment to quantify a variation distance of each variant in each class with respect to the input string. The applied statistical algorithm(s) generate a numerical value, which is applied to a sorting algorithm, for selection of an appropriate variant. In one embodiment, the selection extends beyond presentation of the variant. For example, the selection may include submission of the variant or substitution of the input string with the variant, thereby causing an associated machine, e.g. hardware device, to perform an action based on the variant. In one embodiment, the variant may be exemplified as a spelling correction or word substitution. Regardless of the correction, the replacement of the input string with the variant changes the associated functionality and action of the machine in receipt of the variable.

Figure 4:
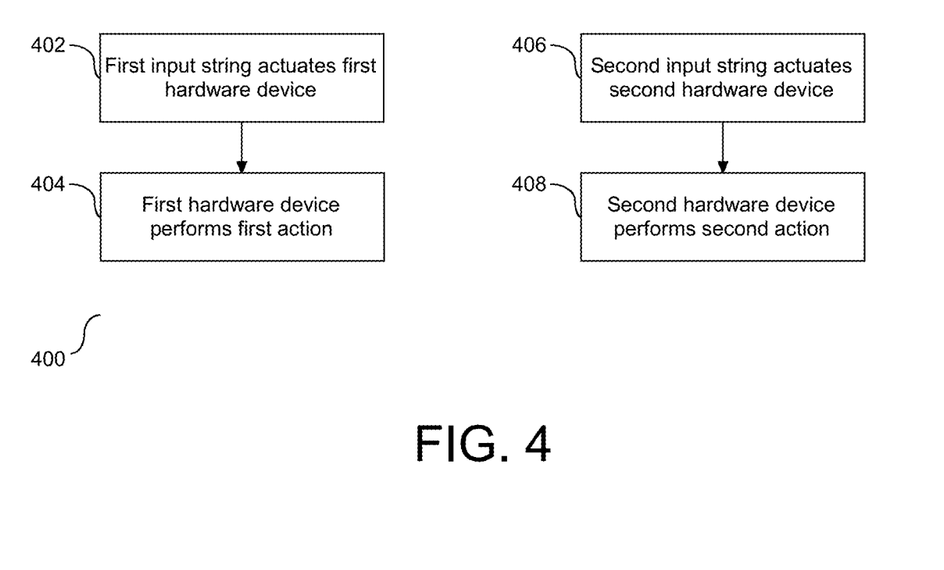
FIG. 4 depicts a flow chart illustrating a process for processing dialog data in relation to a physical hardware device.

Referring to FIG. 4, a flow chart (400) is provided illustrating a process for processing dialog data in relation to a physical hardware device. As shown in this example, submission of a first input string results in a first hardware device being actuated (402) to perform a first action (404), and submission of a variant to the first input string (406), referred to herein as a second input string, results in a second hardware device being actuated to perform a second action (408). In this example, the first and second hardware devices are different and the corresponding first and second actions are different. Submission of the variant produces a physical action on a hardware device that is different in form and function from the physical action associated with the input string. For example, in one embodiment, activation of the hardware device changes the operating state of the device from a first state to a second state. In one embodiment, the first and second input strings may be assigned to the same hardware device, with actuation producing different physical output. Similarly, in one embodiment, the different form of the first and second input strings may be addressed to different physical devices. Accordingly, as shown, a physical intent from the captured input string is converted into a physical manifestation that produces one or more physical transformations upon invocation of the variant.

As disclosed herein, the linguistic analysis processing may be performed by a natural language processing system, such as the information handling system (152) as shown in FIG. 1, or any suitable information handling system. In one embodiment, a sentence parsing tool, such as but not limited to SGL, is applied to break the text representation of the received audio into constituent parts to find the sentence parts and location sequence, and to identify a segment or keyword within the representation. The machine learning process presents the identified keyword(s) to the corpus to search for evidence of one or more variants.

Embodiments may be in the form of a system with an intelligent computer platform for deciphering input content. A processing unit is operatively coupled to memory and is in communication with an artificial intelligence platform. A tool or detection engine (154), also in communication with the processing unit, is employed to decipher a phrase and identify any segment or keywords therein upon activation by the artificial intelligence platform. The procedure of deciphering the phrase utilizes a natural language processing tool.

The tool (154) continues by searching a corpus for evidence of a pattern associated with the identified keyword(s), such as congruence of corpus evidence with the identified keyword(s), and generating an outcome in the form of variants employed to invoke a physical action on an associated hardware device, or in one embodiment to invoke a user interface trace. The generated variants identified with support of the corpus have a strong congruence to the identified segment(s) or keyword(s), and in one embodiment an underlying application.

As shown and described, the corpus (160) may be populated by the tool (154) with one or more segments or keywords associated with the input content. The tool (154) completes the task of assessing the received input content, including converting audio input into a text representation and leveraging a natural language processing tool for identification of one or more keywords in the text representation. The tool (154) utilizes the corpus for evidence of a pattern associated with the set of variants and classes, and at the same time adds entries to the corpus for future patterns of evidence.

Embodiments may also be in the form of a computer program device for use with an intelligent computer platform in order to assist the intelligent computer platform to evaluate text input and text representation of audio input. The device has program code embodied therewith. The program code is executable by a processing unit to parse the text representation, and identify any keywords therein. The parsing may be performed in accordance with SGL or any other form of natural language processing As shown and described, in one embodiment, the processing unit supports functionality to search the corpus for evidence of variants and associated classes and/or subclasses, scores each variant according to a statistical evaluation, and selects an entry from the outcome set based on the scoring. The final output is jointly determined by the classifier and the distance metric. The processing unit completes the program coded task by converting the selected entry into an executable instruction applied to a physical hardware device that transforms the hardware device from a first state to a second state.

It will be appreciated that there is disclosed herein a system, method, apparatus, and computer program product for evaluating natural language input, and detecting one or more keywords and associated variants invoked in a corresponding computer platform. As disclosed, the system, method, apparatus, and computer program product apply natural language processing to an information source to identify a variant corresponding to the intent of the original input text or speech.

While particular embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiment. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product is operative to improve the functionality and operation of a machine learning model based on pattern dissection, keyword identification and their meanings to determine variants.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. In particular, the natural language processing may be carried out by different computing platforms or across multiple devices. Furthermore, the data storage and/or corpus may be localized, remote, or spread across multiple systems. Accordingly, the scope of protection of these embodiments is limited only by the following claims and their equivalents.

What is claimed is:

1. A computer system comprising:
   a processing unit operatively coupled to memory;
   an artificial intelligence platform, in communication with the processing unit;
   a knowledge engine in communication with the processing unit and configured to utilize machine learning to assess dialog input data received by the artificial intelligence platform;
   a dialog manager operatively coupled to the processing unit and the knowledge engine, the dialog manager configured to:
      identify one or more keywords present in the dialog input data and replace the one or more keywords with one or more tokens; and
      using the one or more tokens, create alternative dialog input data as potential replacements for the dialog input data, each of the alternative dialog input data representing a variant of the dialog input data; and
   a classifier operatively coupled to the processing unit and the knowledge engine, the classifier configured to:
      compute, for each variant, a respective replacement score comprising a distance metric assessment of a degree of deviation of the variant from the dialog input data;
      assign each of the variants to at least one respective text classification of a plurality of text classifications;
      assess, for each of the variants, a respective confidence value associated with the assignment of the variant to the at least one respective text classification;
      statistically assess the variants, each statistical assessment being based on at least the replacement score of the variant and the confidence value associated with the assignment of the variant to the at least one text classification;
      aggregate the statistical assessments with respect to each of the text classifications;
      select a text classification from the plurality of text classifications based on the aggregated statistical assessments;
      identify final dialog data from the selected text classification; and
      construct an output string corresponding to the final dialog data, including replace the dialog input data with the identified final dialog data based on the statistical assessment and the selected text classification.

2. The system of claim 1, wherein the output string constructed by the classifier is configured to transform a physical hardware device from a first operating state to a second operating state.

3. The system of claim 1, wherein the knowledge engine is configured to select the variant with a minimal replacement score.

4. The system of claim 1, wherein the assigned confidence value reflects accuracy of a correct classification of each variant.

5. The system of claim 1, wherein the classifier is further configured to classify each of the variants into at least two text classifications of the plurality of text classifications, and wherein the statistical assessment comprises separately statistically assessing each variant with respect to each of the at least two text classifications.

6. The system of claim 5, wherein the classifier is further configured to aggregate the statistical assessments in each of the text classifications.

7. The system of claim 6, wherein the classifier is further configured to sort the text classifications based on the aggregated statistical assessment, and to select the final dialog data responsive to a position in the sort.

8. A computer program product to convert input content into a physical action, the computer program product comprising:
   a computer readable storage medium having program code embodied therewith, the program code executable by a processing unit to:
      utilize machine learning to assess dialog input data received by an artificial intelligence platform;
      identify one or more keywords present in the dialog input data and replace the one or more keywords with one or more tokens;
      using the one or more tokens, create alternative dialog input data as potential replacements for the dialog input data, each of the alternative dialog input data potential replacements representing a variant of the dialog input data;
      compute, for each variant, a replacement score comprising a distance metric assessment of a degree of deviation of the variant from the dialog input data;
      assign each of the variants to at least one respective text classification of a plurality of text classifications;
      assess, for each of the variants, a respective confidence value associated with the assignment of the variant to the at least one respective text classification;
      statistically assess the variants, each statistical assessment being based on at least the replacement score of the variant and the confidence value associated with the assignment of the variant to the at least one respective text classification;

aggregate the statistical assessments with respect to each of the text classifications;
apply a classifier to select a text classification from the plurality of text classifications based on the aggregated statistical assessments;
identify-final dialog data from the selected text classification; and
construct an output string corresponding to the final dialog data, including replace the dialog input data with the identified final dialog data based on the statistical assessment and the selected text classification.

9. The computer program product of claim 8, wherein the program code executable by the processing unit to construct an output string comprises program code executable by the processing unit to construct the output string to transform a physical hardware device from a first operating state to a second operating state.

10. The computer program product of claim 8, further comprising program code executable by the processing unit to select a variant with a minimal replacement score.

11. The computer program product of claim 8, wherein the assigned confidence value reflects accuracy of a correct classification of each variant.

12. The computer program product of claim 8, further comprising program code executable by the processing unit to classify each of the variants into at least two text classifications of the plurality of text classifications, and separately statistically assess each variant with respect to each of the at least two text classifications.

13. The computer program product of claim 12, further comprising program code executable by the processing unit to aggregate the statistical assessments in each of the text classifications.

14. The computer program product of claim 13, further comprising program code executable by the processing unit to sort the classifications based on the aggregated statistical assessment, and to select the final dialog data responsive to a position within the sort.

15. A method comprising:
utilizing machine learning to assess dialog input data received by an artificial intelligence platform;
using a processing unit, identifying one or more keywords present in the dialog input data and replacing the one or more keywords with one or more tokens;
using the processing unit and one or more tokens, creating alternative dialog input data as potential replacements for the dialog input data, each of the alternative dialog input data representing a variant of the dialog input data;
using the processing unit, computing for each variant a replacement score comprising a distance metric assessment of a degree of deviation of the variant from the dialog input data;
using a classifier operatively connected to the processing unit, assigning each of the variants to at least one respective text classification of a plurality of text classifications;
using the processing unit, assessing for each of the variants a respective confidence value associated with the assignment of the variant to the at least one respective text classification;
using the processing unit, statistically assessing the variants, each statistical assessment being based on at least the replacement score of the variant and the confidence value associated with the assignment of the variant to the at least one respective text classification;
using the processing unit, aggregating the statistical assessments with respect to each of the text classifications;
using the processing unit, selecting a text classification from the plurality of text classifications based on the aggregated statistical assessments;
using the processing unit, identifying-a final dialog data from the selected text classification; and
constructing an output string corresponding to the final dialog data, including replacing the dialog input data with the identified final dialog data based on the statistical assessment and the selected text classification.

16. The method of claim 15, further comprising, using the computer processor, selecting a variant with a minimal replacement score.

17. The method of claim 15, wherein the assigned confidence value reflects accuracy of a correct classification of each variant.

18. The method of claim 15, further comprising, using the computer processor, classifying each of the variants into at least two respective text classifications of the plurality of text classifications, and separately statistically assessing each variant and each of the at least two text classifications.

19. The method of claim 18, further comprising, using the computer processor, aggregating the statistical assessments in each of the text classifications.

20. The method of claim 19, further comprising, using the computer processor, sorting the text classifications based on the aggregated statistical assessment and selecting the final dialog data responsive to the sorting.

* * * * *